(No Model.)
J. D. FITZGERALD.
CORN PLANTER.
No. 397,351. Patented Feb. 5, 1889.
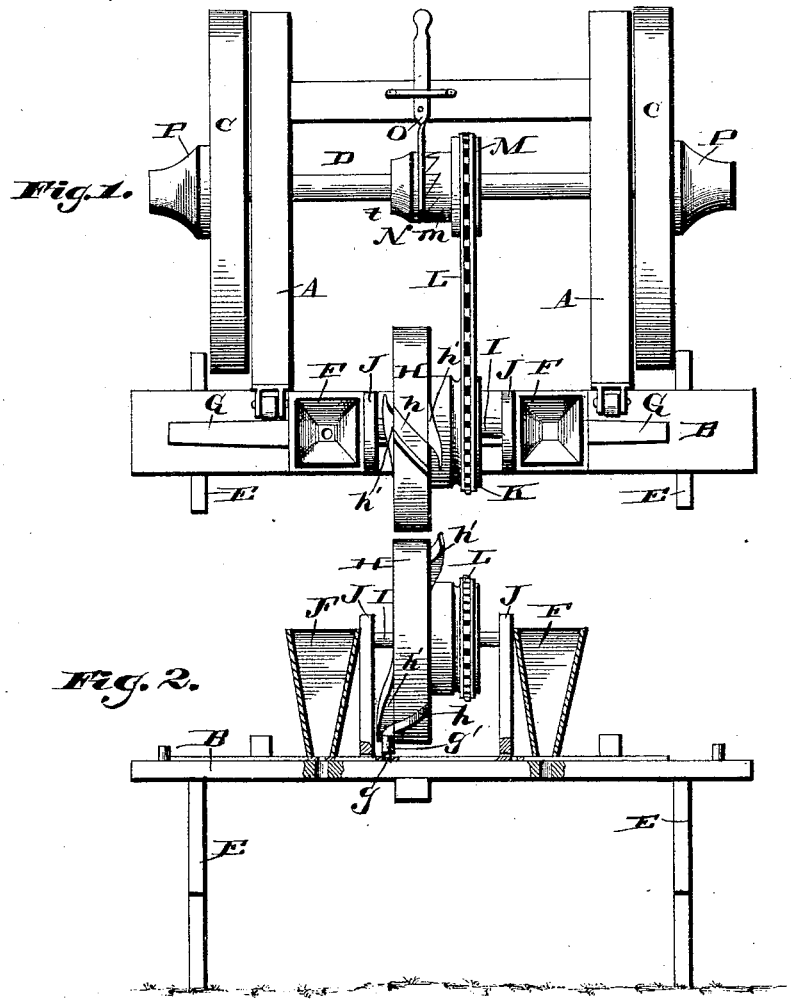
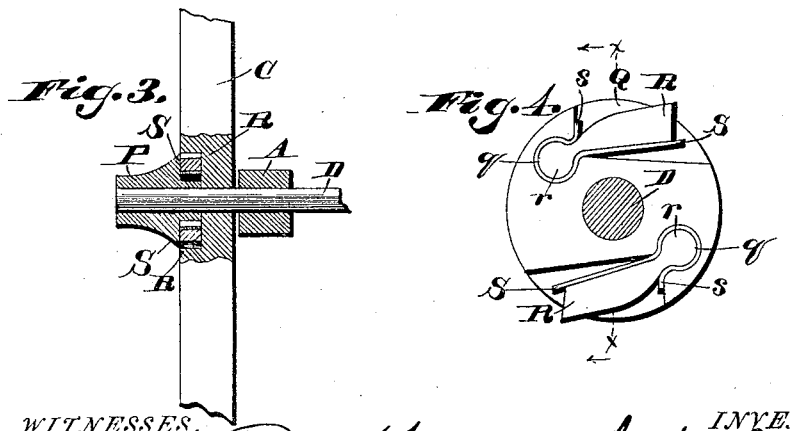
WITNESSES.
Walter H. Humphreys.
Van Buren Hillyard.
INVENTOR
Jasper D. Fitzgerald
By R. S. & A. P. Lacey
Attorneys

UNITED STATES PATENT OFFICE.

JASPER D. FITZGERALD, OF ELDON, IOWA.

CORN-PLANTER.

SPECIFICATION forming part of Letters Patent No. 397,351, dated February 5, 1889.

Application filed October 27, 1888. Serial No. 289,293. (No model.)

*To all whom it may concern:*

Be it known that I, JASPER D. FITZGERALD, a citizen of the United States, residing at Eldon, in the county of Wapello and State of Iowa, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to corn-planters, and has for its object the construction of a planter that will drop the grain at regular distances apart, and which can be thrown in and out of gear at will, and which will comprise a minimum number of operating devices, will be accessible to all parts, and which can be conveniently handled.

The improvement consists in the novel features and the peculiar construction and combination of the parts, which will be hereinafter more fully described and claimed, and shown in the annexed drawings, in which—

Figure 1 is a top plan view of a planter embodying my invention; Fig. 2, a front view, parts being broken away, showing the cam-wheel and the seed-slide-operating devices; Fig. 3, a detail sectional view of the driving-axle, the wheel, and the hub; and Fig. 4, a view of the inner end of the hub.

The frame is composed of two parts, A and B, of ordinary construction, which are hinged together in the usual manner. The part A is supported on the wheels C C on the ends of the driving-axle D, and the part B is supported on the runners E E. The seed-boxes F F are mounted on the part B, and the seed-slide G, extending from one box to the other, rests on the part B and is provided with the vertical arm $g$, on the upper end of which is the roller $g'$. The cam-wheel H, mounted on the shaft I, that is journaled in the vertical standards J, has oblique grooves $h$ across its periphery. The tapering blocks $h'$, secured to the sides of the wheel H, and having their outer edges flush with the periphery of the said wheel, have their front ends inclined outwardly and forming a prolongation of the rear walls of the grooves $h$. The blocks are arranged on opposite sides of the wheel, and their front ends, projecting beyond its sides, engage with the end of the arm $g$ alternately and move the seed-slide endwise from side to side of the machine to effect a disposition of the grain in the well-known manner. The sprocket-wheel K on the shaft I is integral with the wheel H by preference, but may be separate therefrom. The endless sprocket-chain L passes around the sprocket-wheel K and a corresponding sprocket-wheel, M, on the axle D, and transmits motion from the said axle to the said wheel K, shaft I, and wheel H. The sprocket-wheel M has a clutch, $m$, on one end and runs loose on the axle D. The clutch-sleeve N, mounted to slide on the axle, but to revolve therewith, is operated by the shipper-lever O and effects a connection between the said wheel M and the axle D.

The wheels C are mounted to turn loosely on the axle, and have recesses in their inner sides, within which the inner ends of the hubs P, keyed to the ends of the axle, are fitted. The inner ends of the hubs have recesses Q and circular depressions $q$ at the inner ends of the recesses. The pawls R, arranged in the recesses Q and having heads $r$, are held to the hubs by having their heads $r$ fitted in the circular depressions $q$. The pawls are forced outward at their outer ends by the springs S, which have their inner ends, $s$, fitted around the circular heads $r$ of the pawls, as shown.

When the machine is drawn over the field, the pawls R engage with the outer wall of the recesses in the inner sides of the wheel and cause them to revolve with and impart movement to the axle. On the other hand, if the machine is backed, the wheels will turn loosely on the axle and impart no movement thereto.

The operation of the machine is manifest. However, it may be well to explain the operation of the cam-wheel, which in its revolutions engages the arm $g$ by its side projections, $h'$, and moves the said arm from one side of the wheel to the other alternately, the said arm traversing the grooves $h$. When the arm has passed from one side of the wheel to the other, it rests against the side of the said wheel until engaged by one of the said projections, thereby being held from accidental displacement.

The cam-wheel may be numbered in inches around its periphery.

Having thus described my invention, what I claim, and desire to secure by Letters Patent, is—

1. In a corn-planter, the combination of the frame, the driving-axle, the sprocket-wheel on the said axle, the shaft I, driven from the sprocket-wheel on the axle, the cam-wheel having oblique grooves across its periphery and lateral projections, as $h'$, having their front ends inclined outwardly and forming a prolongation of the rear walls of the said oblique grooves, the seed-slide, and the arm projecting from the seed-slide and adapted to be engaged by the said projections $h'$ and carried through the oblique grooves, substantially as and for the purpose described.

2. In a corn-planter, the combination, with the seed-slide having an arm, as $g$, of the wheel H, having oblique grooves $h$ and lateral projections $h'$, which have their front ends inclined outwardly and forming a prolongation of the rear walls of the said grooves $h$, substantially as and for the purpose described.

3. In a planter, the combination, with the frame, the seed-slide, the cam-wheel for operating the seed-slide, the axle, and the wheels loosely mounted on the axle and having recesses in their sides, of the hubs keyed to the axle, and having their ends fitted in the said recesses in the wheels, and having recesses Q and circular depressions $q$, the pawls R, having circular heads $r$, and the springs S, having their ends $s$ fitted about the circular heads $r$ of the said pawls, substantially as described, for the purpose specified.

In testimony whereof I affix my signature in presence of two witnesses.

JASPER D. FITZGERALD.

Witnesses:
E. W. GRIMSTEAD,
E. T. ROLAND.